(12) United States Patent
Piché

(10) Patent No.: US 6,189,944 B1
(45) Date of Patent: Feb. 20, 2001

(54) FOOD SERVICE KIOSK

(75) Inventor: Charles J. Piché, Greeley, CO (US)

(73) Assignee: Classic Carts Corporation, Greeley, CO (US)

( * ) Notice: Under 35 U.S.C. 154(b), the term of this patent shall be extended for 0 days.

(21) Appl. No.: 09/400,264

(22) Filed: Sep. 21, 1999

(51) Int. Cl.[7] .................................................. B60P 3/025
(52) U.S. Cl. ............................................ 296/22; 296/24.1
(58) Field of Search ..................................... 296/22, 24.1

(56) References Cited

U.S. PATENT DOCUMENTS

| | | |
|---|---|---|
| D. 83,075 | 1/1931 | Stromberg . |
| D. 115,036 | 5/1939 | Franco . |
| D. 156,547 | 12/1949 | Madison . |
| D. 159,943 * | 9/1950 | Amaral .................................... 296/22 |
| D. 162,792 * | 4/1951 | Compton ................................. 296/22 |
| D. 165,218 | 11/1951 | Coleman . |
| D. 194,421 | 1/1963 | Weinstein . |
| D. 203,532 | 1/1966 | MacDuckston . |
| D. 205,931 | 10/1966 | Eichler . |
| D. 213,680 | 4/1969 | Rogers . |
| D. 219,436 | 12/1970 | Marcott . |
| D. 243,753 | 3/1977 | Raupp et al. . |
| 489,893 | 1/1893 | Buckley . |
| 780,265 * | 1/1905 | Clossen ................................. 296/22 |
| 1,176,106 | 3/1916 | True . |
| 1,263,805 * | 4/1918 | Rice ....................................... 296/22 |
| 1,285,304 * | 11/1918 | Merrill ................................... 296/22 |
| 2,982,578 * | 5/1961 | Lowe ...................................... 296/22 |
| 3,191,400 * | 6/1965 | Swenson ............................... 296/22 |
| 3,249,381 * | 5/1966 | Golden ................................. 296/22 |
| 4,270,319 | 6/1981 | Spasojevic . |
| 4,632,836 * | 12/1986 | Abbot et al. .......................... 426/302 |
| 4,912,338 * | 3/1990 | Bingham ............................... 307/9.1 |
| 4,919,477 * | 4/1990 | Bingham et al. .................... 296/24.1 |
| 4,971,377 * | 11/1990 | Aquilante ............................... 296/22 |
| 4,974,899 * | 12/1990 | Sargent ................................ 296/156 |
| 5,833,295 * | 11/1998 | Farlow, Jr. ........................... 296/24.1 |
| 5,938,261 * | 8/1999 | Faba ....................................... 296/22 |
| 6,098,346 * | 8/2000 | Miller et al. ............................. 52/67 |

* cited by examiner

Primary Examiner—Dennis H. Pedder
Assistant Examiner—Greg Blankenship
(74) Attorney, Agent, or Firm—Fields and Johnson, P.C.

(57) ABSTRACT

A food service kiosk is provided in the shape of a vehicle wherein the engine compartment is used for storage of enough water for food preparation and subsequent cleanup without leaving the food service site. A three-hole sink, a hand sink and a mop sink are located within the body section of the food service kiosk. Gray water from the three-hole sink drains into the mop sink which drains into the gray water tank. The engine compartment provides storage room for a fresh water tank, a hot water heater and a gray water storage tank which is not available in a conventional food service kiosk. Water from the mop sink drains into the gray water storage tank. If required for an extended stay at a food service site, a trailer can be attached to the rear end of the food service kiosk which contains a large fresh water storage tank for resupplying the fresh water tank in the engine compartment. An auxiliary pump is provided within the trailer for pumping the fresh water from the storage tank to the fresh water tank through suitable water pipes within the body of the food service kiosk and the trailer. Power is supplied to the auxiliary pump at the trailer or through electrical lines running from the kiosk to the trailer.

23 Claims, 5 Drawing Sheets

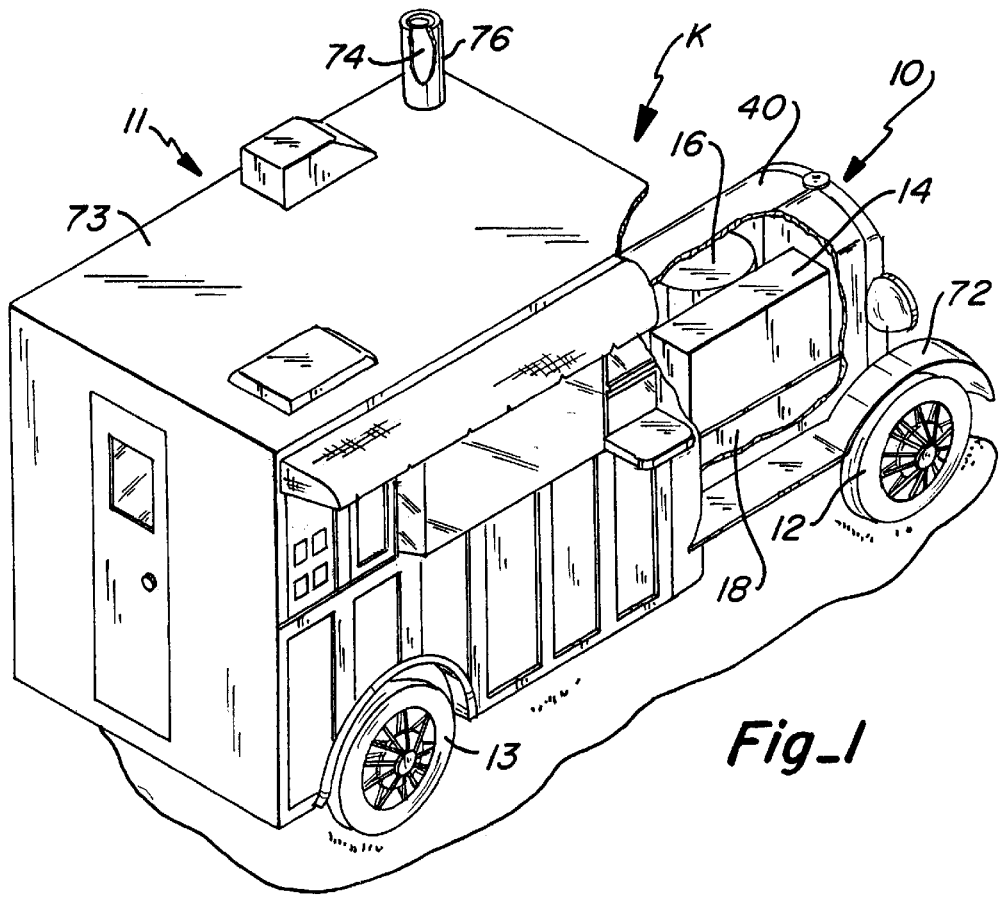
Fig_1
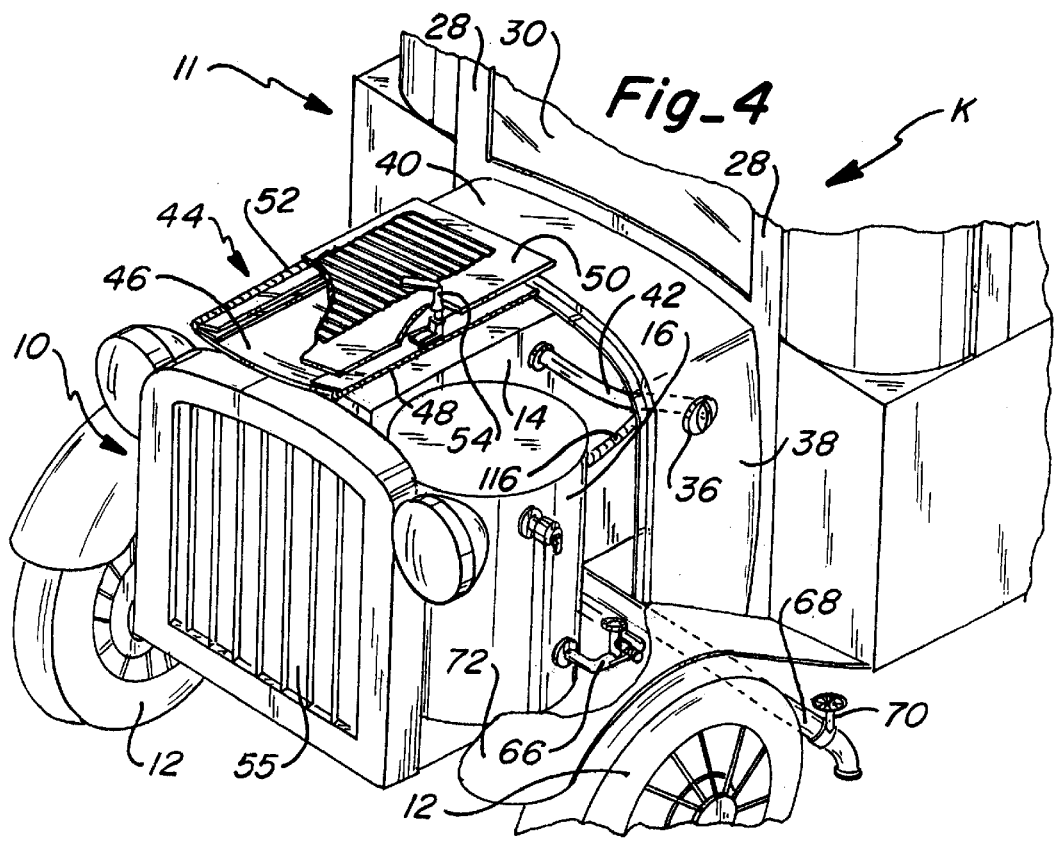
Fig_4

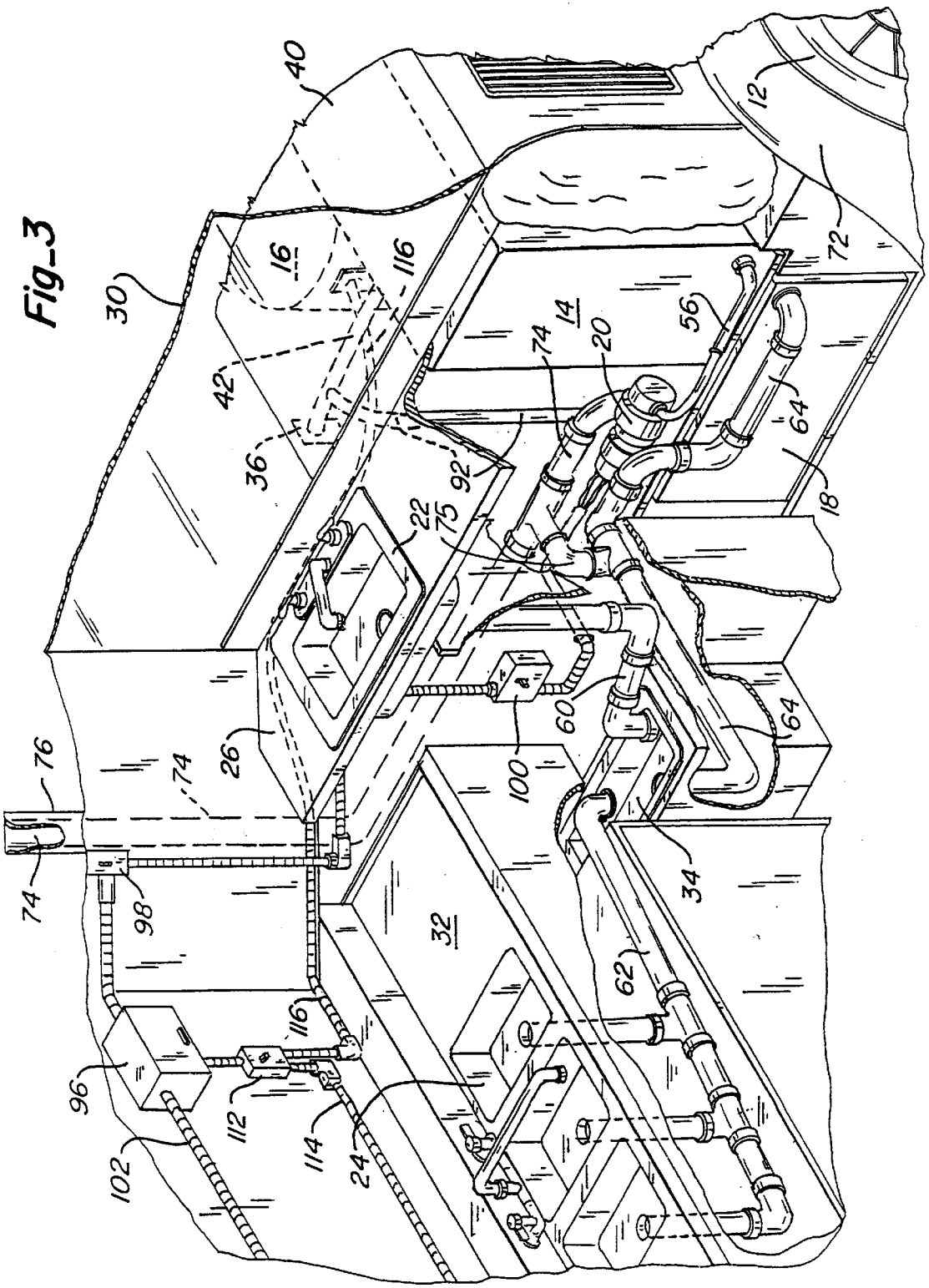

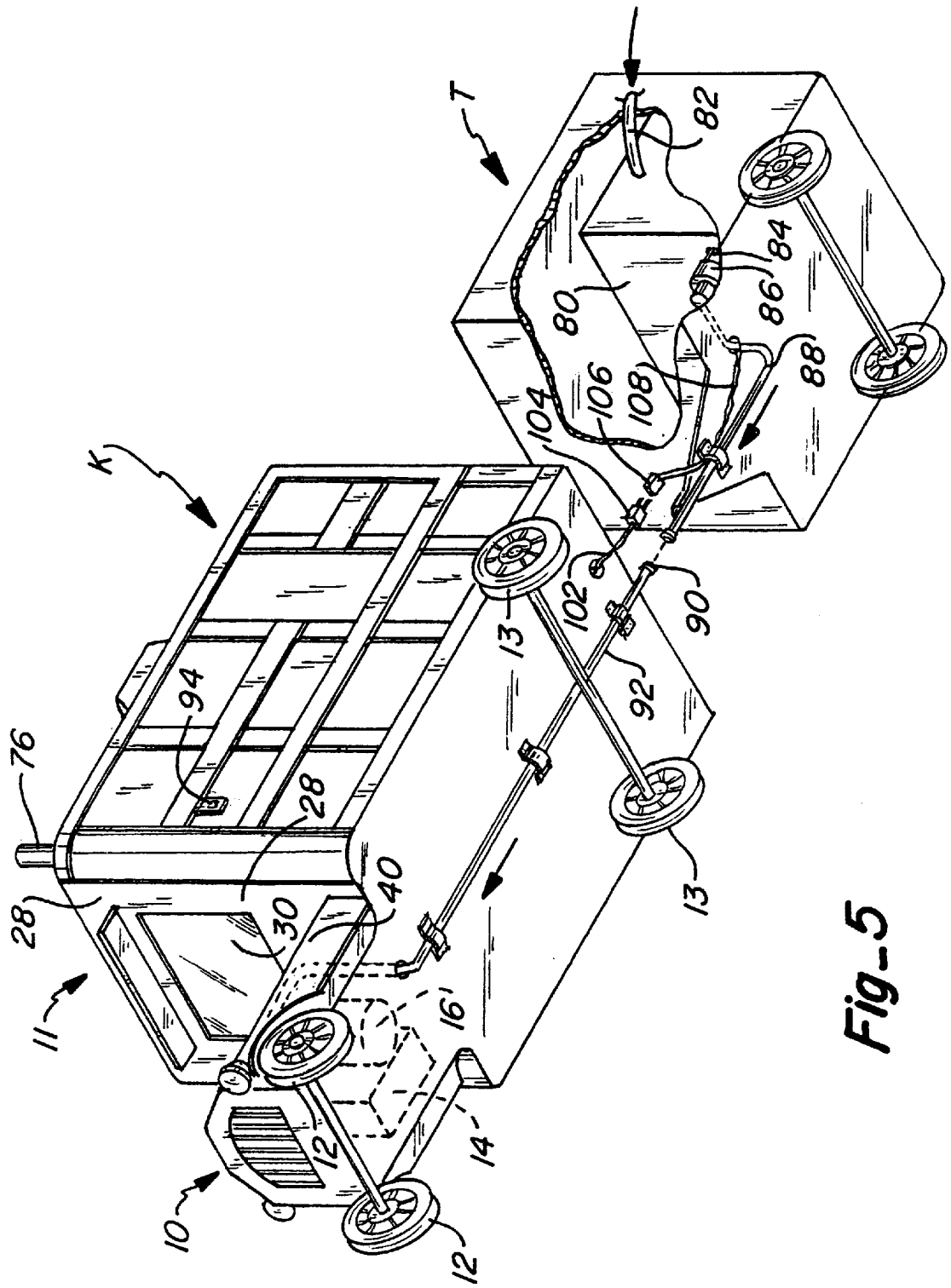
Fig_5

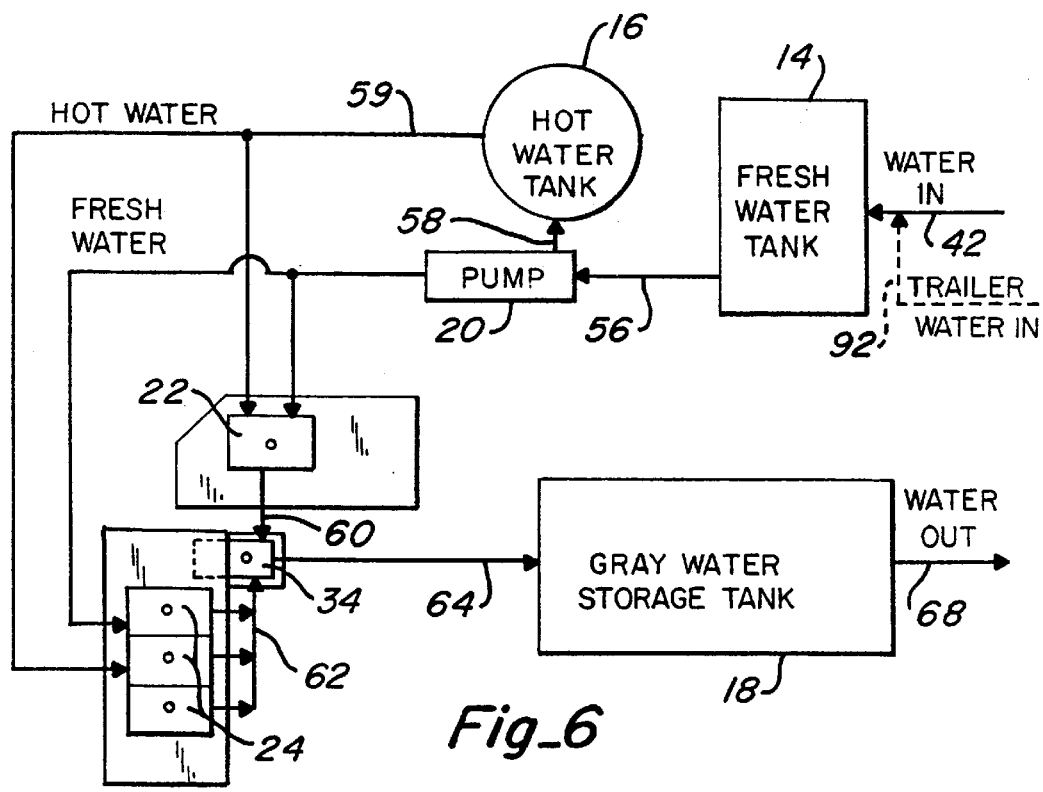
Fig_6
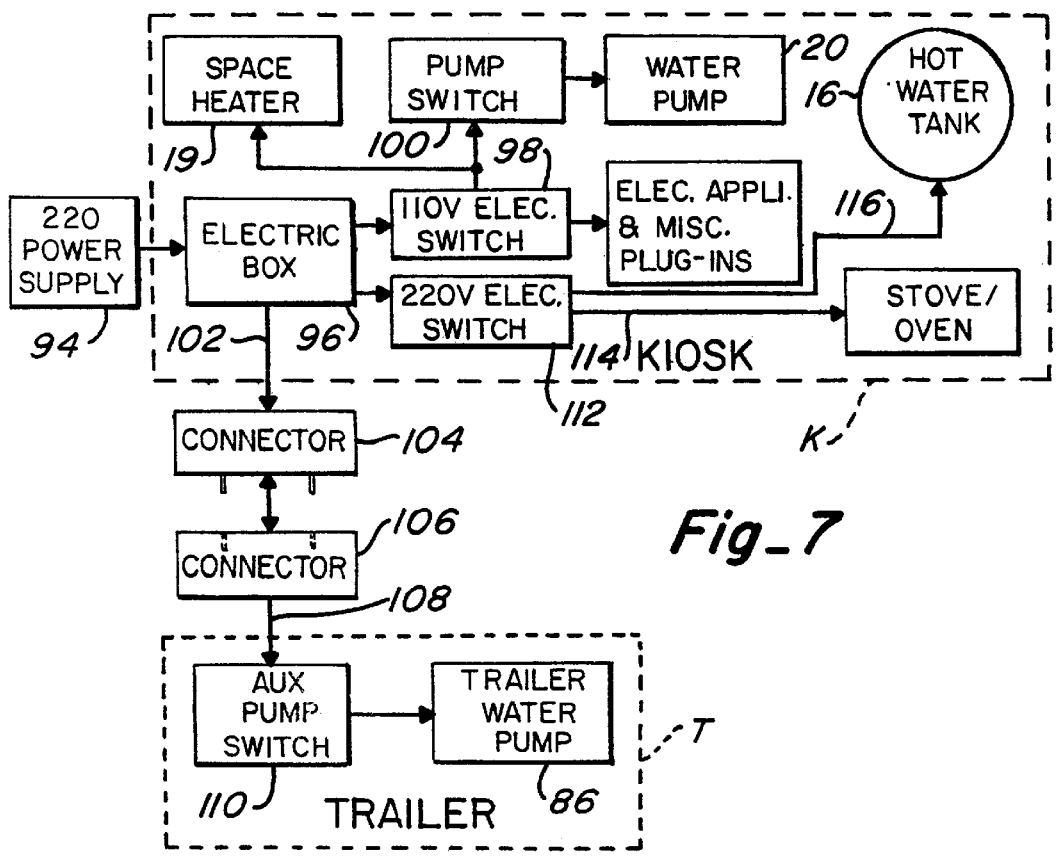
Fig_7

FOOD SERVICE KIOSK

TECHNICAL FIELD

This invention relates to a food service kiosk and, more particularly, to a food service kiosk which simulates a wheeled vehicle containing a water system within an engine compartment and food storage and preparation facilities within a body section thereof.

Background Art

Food kiosks and other mobile food service structures have been in use for many years. They provide a means of serving food at remote locations, such as parks, street corners, malls, fair grounds, parking lots and the like. Examples of such food service structures are described below.

Rice U.S. Pat. No. 1,263,805 discloses an old truck in which the body of the truck is used for cooking food. At the rear of the vehicle is a water tank which is connected to the radiator cooling system of the engine for providing auxiliary cooling of the engine. A hot water boiler is located just forward of water tank. The food is prepared on stock boilers located along the center of the body of the vehicle.

Buckley U.S. Pat. No. 489,893 discloses a lunch wagon having a kitchen area at the rear end of the wagon and a dining area at the front of the wagon. The kitchen area has a cooler with an ice water compartment and a hot water holder. Waste water is allowed to drain onto the ground or street.

Farlow, Jr. U.S. Pat. No. 5,833,295 discloses a mobile kitchen designed for serving over 300 people within 2 hours using three cooks and contains enough fuel, water and supplies for at least one meal upon arrival at the site. A center section of the kitchen contains two sinks, a hot water heater and a 55 gallon cold water tank. There is no disclosure concerning the handling of gray water.

Spasojevic U.S. Pat. No. 4,270,319 discloses a mobile vending booth in which the cooks stand and work along a center aisle with the various food preparation stations located along the sides of the aisle. One of these stations is a washing up unit.

True U.S. Pat. No. 1,176,106 discloses a portable kitchen in the form of a wagon which includes a hot water heater.

Although each of these devices is suitable for its intended use, none are completely self-contained. In other words, each must be moved off-site to a commissary for required daily cleaning, sanitation and refreshing of water tanks. This is true because they contained inadequate water storage for cleanup and/or inadequate storage for gray water. One reason is that since space is limited, most of it must be used for food storage and preparation rather than for water storage.

DISCLOSURE OF THE INVENTION

In accordance with the present invention, a wheel mounted food service kiosk has the appearance of a vehicle with a body section containing food storage and preparation facilitates. The food storage and preparation facilities include one or more sinks. An engine compartment contains a water system for storage of fresh and gray water, a hot water heater and an electric pump for pumping hot and cold water to the sink. An inlet is provided in the engine compartment for filling the fresh water tank from a fresh water spigot. A power supply is connected to the electric pump and electrical appliances for supplying electricity from a suitable local power source. The front wheels of the kiosk, adjacent the engine compartment, have fenders, one of which extends over a valve connected to the gray water tank for discharge of gray water therefrom at an off-site location.

The engine compartment has a hood wherein an upper section of a door is hinged along the top of the hood and a lower section is hinged to the upper section to provide access to the engine compartment for servicing the water tanks, the heater, the pump and associated valves and pipes. A latch along the lower edge of the lower section secures the door in a closed/locked position.

Another feature of the invention is the provision of a mop sink under a drain pipe connected to at least one of the sinks for receiving gray water therefrom. The gray water in the mop sink then drains into the gray water tank for later disposal. If the kiosk has more than one sink, each sink will have a drain pipe extending from it into the mop sink.

With the structure just described, a food service kiosk is provided which can be used for an extended period of time on site while still meeting all of the governmental regulatory requirements for sanitation.

If the food service kiosk is to remain on location for an extremely long period of time and if additional fresh water capacity is required, a trailer can be attached to the rear of the kiosk which has a storage tank of fresh water for replenishing the fresh water in the fresh water tank. The kiosk has a fresh water supply line extending from the fresh water tank to the rear end of the body section. The trailer has a second water supply line running from the storage tank to the front end of the trailer and connected to the first water supply line by a coupler. An auxiliary pump in the trailer is connected between the storage tank and the second water supply line to pump water from the storage tank to the fresh water tank through the second and first water supply lines, respectively.

The auxiliary pump can be connected to a source of electricity located on the trailer or a first electric line can extend from a power supply in the kiosk to the rear end of the body thereof and a second electric line, connected to the first electric line by an electric coupler, can extend from the front end of trailer to the auxiliary pump for providing power thereto.

From the foregoing, the objects of this invention are readily apparent. A food service kiosk is provided in the shape of a vehicle wherein the engine compartment is used for storage of enough water for food preparation and subsequent cleanup without leaving the food service site. Food storage preparation facilities, which include one or more food preparation and/or cleanup sinks and a hand sink, as well as a mop sink therebelow, are located within the body section of the food service kiosk. Typically, the food preparation and/or cleanup sink is a conventional three-hole sink for washing, rinsing and sanitizing. Gray water from the three-hole sink and hand sink drains into the mop sink. The engine compartment provides storage space for a fresh water tank, a hot water heater and a gray water storage tank which is not available in sufficient quantity in a conventional food service kiosk. Water from the mop sink drains into the gray water storage tank. If additional fresh water capacity is required, a trailer can be attached to the rear end of the food service kiosk which contains a large fresh water storage tank for resupplying the fresh water tank in the engine compartment. An auxiliary pump is provided within the trailer for pumping the fresh water from the storage tank to the fresh water tank through suitable water pipes within the body of the food service kiosk and the trailer. Power is supplied to the auxiliary pump at the trailer or through electrical lines running from the kiosk to the trailer.

Additional advantages of this invention will become apparent from the description which follows taken in conjunction with the accompanying drawings.

BRIEF DESCRIPTION OF THE DRAWINGS

FIG. 1 is a fragmentary perspective view of the food service kiosk of this invention;

FIG. 3 is an enlarged fragmentary perspective view of the front end of the body section and a portion of the engine compartment of the food service kiosk;

FIG. 4 is an enlarged, fragmentary, perspective view of the engine compartment;

FIG. 5 is a bottom perspective view showing the food service kiosk of this invention with a trailer attached thereto to provide a source of additional fresh water;

FIG. 6 is a diagram of the water system for the food service kiosk; and

FIG. 7 is an electrical diagram for the food service kiosk.

BEST MODE FOR CARRYING OUT THE INVENTION

Figure 2:
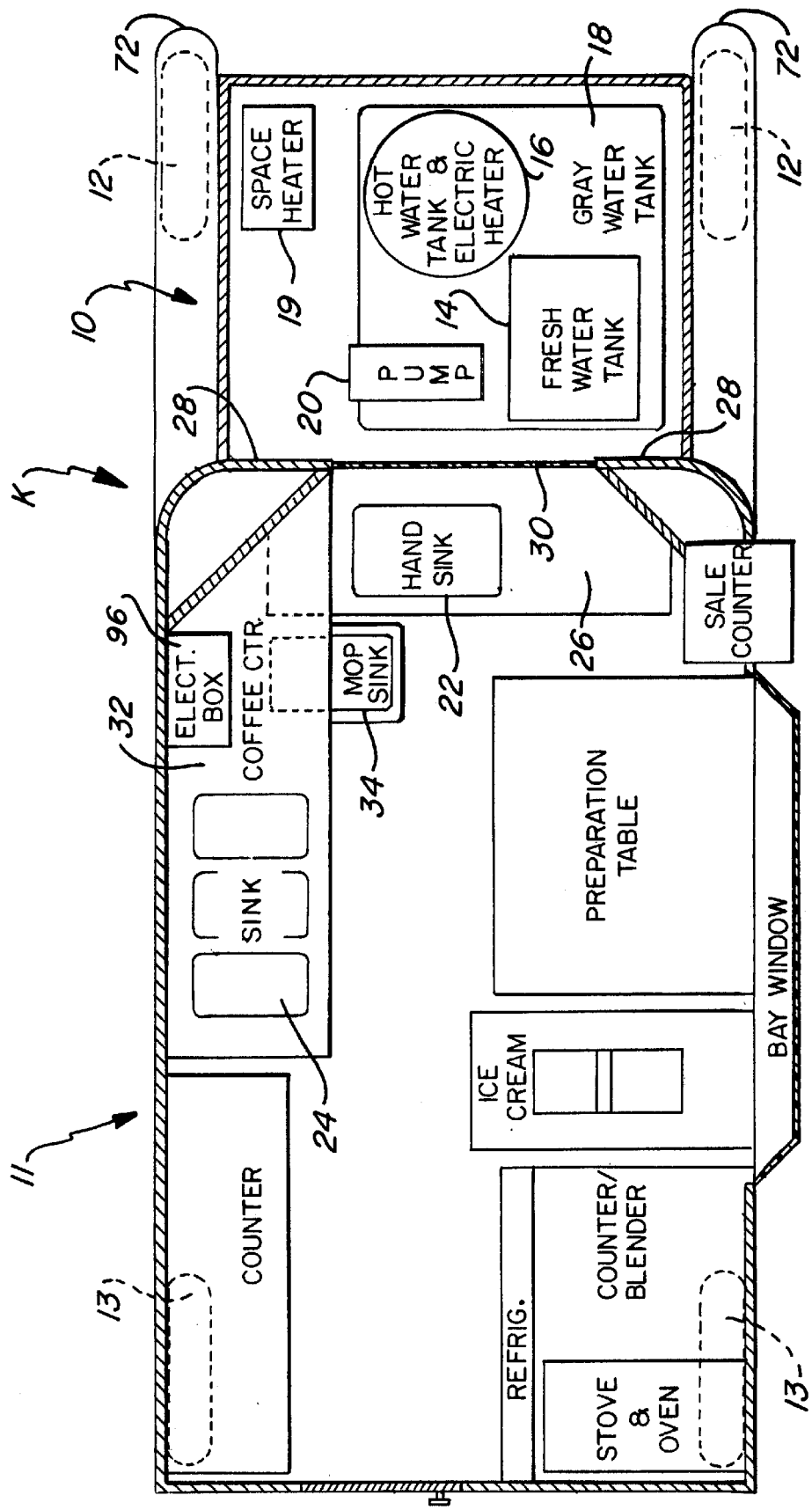
FIG. 2 is an enlarged top plan view of the food service kiosk, with portions broken away to diagrammatically show the arrangement within the interior thereof.

In accordance with this invention, a food service kiosk K in the form of a vehicle is provided which has a separate compartment in the form of an engine compartment 10 and an integral body section 11, as best seen in FIGS. 1, 2 and 4. Engine compartment 10 is supported by a pair of front wheels 12 and the body section 11 is supported by a pair of rear wheels 13 for moving the kiosk from a trailer (not shown) on which the kiosk would be transported to an appropriate food serving site. The engine compartment 10 does not contain an engine since kiosk K is not a working vehicle, but provides a relatively large space for storing all of the water needed for the food storage and preparation facilitates mounted in body section 11. Included in engine compartment 10 are a fresh water tank 14, hot water heater 16, gray water storage tank 18, thermostatically controlled electric space heater 19 and an electric pump 20 for supplying hot and cold water to hand sink 22 and three-hole sink 24 located in body section 11, as described below. Electric space heater 19 is used when the outside temperature is below freezing to keep the temperature within the engine compartment above freezing so that the water does not freeze.

A conventional layout of the food service kiosk K is shown in FIG. 2. The specific food service equipment and the arrangement of that equipment within body section 11 will vary, depending on the type of food products which are served from the kiosk. However, any food service kiosk which meets governmental sanitation regulations will require a hand sink 22, which is shown as mounted in a front counter 26 that extends across substantially the entire front of body section 11. The front wall 28 of body section 11 has a large window 30 which simulates the windshield of a vehicle. The body section also includes three-hole sink 24 with drain board 32 adjacent thereto, as shown. A mop sink 34 is under drain board 32 between three-hole sink 24 and hand sink 22.

As shown in FIGS. 3 and 4, the fresh water tank 14, which may have a capacity of 20 gallons or more, is filled through an inlet 36 mounted in the side wall 38 of hood 40 via filler pipe 42. In order to access the equipment in the engine compartment, hood 40 has a door 44 which includes an upper section 46 attached by its upper edge along the center of the hood by a first piano hinge 48. The lower edge of upper section 46, in turn, is attached to a lower section 50 by a second piano hinge 52. A latch 54 at the lower edge of lower section 50 secures door 44 when it is in the closed position. A grille 55 closes the front end of engine compartment 11.

As seen in FIGS. 3 and 6, an outlet pipe 56 is connected between fresh water tank 14 and pump 20 to pump the water to hot water heater 16 through pipe 58 and to hand sink 22 and three-hole sink 24 through pipe 59. The water system is best seen in FIG. 6. A gray water drain apparatus is provided which drains gray water from hand sink 22 through a first drain pipe 60 into mop sink 34. The gray water from three-hole sink 24 drains through second drain pipe 62 into mop sink 34. The remaining gray water drains from mop sink 34 through third drain pipe 64 into gray water storage tank 18 for later off-site disposal. Finally, gray water storage tank 18 has a discharge pipe 68 which extends to a discharge valve 70, located under left front fender 72, so that the gray water may be disposed of at an appropriate off-site location.

Referring back to FIGS. 1 and 3, a vent pipe 74 has a first end connected to gray water tank 18 and to drain pipe 64 by branch pipe 75. A second end of vent pipe 74 exits the roof 73 of body section 11 through a simulated exhaust pipe 76 to vent gray water tank 18 to the atmosphere.

If additional fresh water capacity is required, a trailer T, shown in FIG. 5, can be attached to the rear in of the kiosk. The trailer contains an auxiliary water storage tank 80, which has an inlet pipe 82 for filling. An outlet pipe 84 is connected to an auxiliary electric pump 86 which in turn is connected to a water discharge pipe 88. Discharge pipe 88 is connected, via connector 90, to auxiliary water line 92, extending along the bottom of kiosk. Auxiliary water line 92 extends forward from the rear end of body section 11 to engine compartment 10 where it communicates with filler pipe 42 to refill fresh water tank 14.

The electrical system for food service kiosk K is shown diagrammatically in FIG. 7. A 220 volt power supply, furnished at the food service site, is connected to electrical box 96. One or more 110 volt electrical switches 98 are activated to provide 110 volt electricity from electric box 96 to the various electrical components within food service kiosk K, as shown. A separate pump switch 100 is provided for activating water pump 20 when water pressure is needed at any of the sinks. Electricity can be provided to the trailer T via electrical line 102 through connectors 104 and 106 and electric line 108 to auxiliary pump switch 110 connected to auxiliary pump 86. A 220 volt switch 112 is activated to provide 220 volt electricity from electric box 96 via conduit 114 to one or more ovens in body section 11 and via conduct 116 to hot water heater 16. Although the use of 220 voltage has been described, other voltages, such as 440 volts, or whatever voltage is common in the locale where the food service kiosk K is to be used is contemplated.

It will be understood that, while the invention has been described and illustrated as simulating an old truck, it could take the form of any type of wheeled vehicle, such as a railroad dining car and the like.

From the foregoing, the advantages of this invention are readily apparent. A food service kiosk, having the appearance of a vehicle, has been provided which can remain on a food service site for an extended period of time. This is possible because the water system is mounted in an engine compartment which provides sufficient space for fresh water and gray water storage for normal usage and for cleanup which meets governmental regulatory requirements. The food service and preparation facilities are mounted in the body section of the kiosk and include one or more sinks, such as a hand sink, a three-hole sink and a mop sink. Both hot and cold water are supplied to the hand sink and the three-hole sink. Both sinks drain their gray water into the mop sink which then drains into the gray water storage tank in the engine compartment.

This invention has been described in detail with reference to particular embodiments thereof, but it will be understood that various other modifications can be effected within the spirit and scope of this invention.

What is claimed is:

1. A food service kiosk which simulates a vehicle and includes:
    a body section having a rear end and a front end;
    food storage and preparation facilities mounted in said body section, said facilities including at least one sink;
    a separate compartment extending forward from said front end of said body section and formed integrally therewith;
    a water system mounted in said separate compartment for storing fresh water and gray water and for supplying water to one sink in said body section;
    a pair of rear wheels mounted on opposite sides of said body section, respectively, for supporting said body section; and
    a pair of front wheels mounted on opposite sides of said separate compartment, respectively, for supporting said separate compartment.

2. A food service kiosk, as claimed in claim 1, wherein said water system includes:
    a fresh water tank;
    a hot water heater in fluid communication with said fresh water tank;
    an electric pump in fluid communication with said fresh water tank for pumping hot water from said hot water heater and cold water from said fresh water tank to said sink;
    a power supply connected to said electric pump; and
    a gray water storage tank in fluid communication with said at least one sink for receiving gray water therefrom.

3. A food service kiosk, as claimed in claim 2, further including:
    an inlet in said separate compartment connected to said fresh water tank for filling said fresh water tank with fresh water.

4. A food service kiosk, as claimed in claim 2, further including:
    a fender over each of said front wheels; and
    a valve under one of said fenders connected to said gray water tank for discharging gray water from said gray water storage tank.

5. A food service kiosk, as claimed in claim 2, wherein said separate compartment includes:
    a hood having a top, opposite sides and a front, and a door on at least one of said sides to provide access to said water system; and
    a vehicle grille closing said front.

6. A food service kiosk, as claimed in claim 5, wherein said door includes:
    an upper section having an upper edge hinged along said top of said hood and having a lower edge;
    a lower section having an upper edge hinged to said lower edge of said upper section and having a lower edge; and
    a latch adjacent said lower edge of said lower section for securing said door in closed/locked position.

7. A food service kiosk, as claimed in claim 2, further including:
    at least one cold water pipe connecting said fresh water tank to said at least one sink; and
    at least one hot water pipe connecting said hot water heater to said at least one sink.

8. A food service kiosk, as claimed in claim 2, further including:
    a gray water drain apparatus connected between said at least one sink and said gray water storage tank through which gray water drains from said at least one sink into said gray water tank.

9. A food service kiosk, as claimed in claim 8, wherein said gray water drain apparatus includes:
    a mop sink mounted in said body section below said at least one sink;
    a first drain pipe connected between said at least one sink and said mop sink for draining gray water from said at least one sink into said mop sink; and
    a second drain pipe connected between said mop sink and said gray water tank for draining gray water from said mop sink into said gray water storage tank.

10. A food service kiosk, as claimed in claim 9, wherein said at least one sink includes:
    a hand sink mounted in said body section at said front end thereof, said first drain pipe being connected between said hand sink and said mop sink for draining water from said hand sink into said mop sink;
    a three-hole sink mounted in said body section proximately to said hand sink; and
    a third drain pipe connected between said three-hole sink and said mop sink for draining gray water from said three-hole sink into said mop sink.

11. A food service kiosk, as claimed in claim 9, further including:
    a front counter extending substantially across said front end of said body section and having said hand sink mounted therein;
    a drain board extending along at least a portion of one side of said body section and adjacent said three-hole sink; and
    said mop sink is mounted under said drain board and between said hand sink and said three-hole sink.

12. A food service kiosk, as claimed in claim 10, further including:
    a front wall at said front end of said body section separating said body section from said separate compartment; and
    a window in said front wall above said front counter simulating the windshield of a vehicle.

13. A food service kiosk, as claim in claim 2, further including:
    a trailer having a front end and attached to said rear end of said body section;
    a storage tank for fresh water mounted in said trailer;
    a first water supply line extending from said fresh water tank to said rear end of said body section;
    a second water supply line in said trailer extending to said front end of said trailer;
    a coupler connecting said first water supply line in fluid communication with said second water supply line; and an auxiliary pump mounted in said trailer and connected between said storage tank and said second water supply line for pumping water from said storage tank through said second and first water supply lines, respectively, to said fresh water tank.

14. A food kiosk, as claimed in claim 13, further including:

a source of electricity connected to said auxiliary pump.

15. A food kiosk, as claimed in claim 14 wherein said source of electricity includes:

a first electrical line extending from said power supply to said rear end of said body;

a second electrical line extending from said auxiliary pump to said front end of said trailer; and an electric coupler electrically connecting said first and second electrical lines to each other.

16. A food service kiosk which simulates a vehicle and includes:

a body section having a rear end and a front end;

food storage and preparation facilities mounted in said body section, said facilitates including at least one sink;

a separate compartment extending forward from said front end of said body section and formed integrally therewith;

a fresh water tank in said separate compartment;

a hot water heater in said separate compartment in fluid communication with said fresh water tank;

an electric pump in said separate compartment in fluid communication with said fresh water tank for pumping hot and cold water to said at least one sink;

a power supply connected to said electric pump;

a gray water storage tank in said separate compartment in fluid communication with said at least one sink for receiving gray water therefrom; and a plurality of wheels supporting said food kiosk.

17. A food service kiosk, as claimed in claim 16, further including:

at least one cold water pipe connecting said fresh water tank to said at least one sink; and at least one hot water pipe connecting said hot water heater to said at least one sink.

18. A food service kiosk, as claimed in claim 16, further including:

a gray water drain apparatus connected between said at least one sink and said gray water storage tank through which gray water drains from said at least one sink into said gray water storage tank.

19. A food service kiosk, as claimed in claim 18, wherein said gray water drain apparatus includes:

a mop sink mounted in said body section below said at least one sink;

a first drain pipe connected between said at least one sink and said mop sink for draining gray water from said at least one sink into said mop sink; and a second drain pipe connected between said mop sink and said gray water storage tank for draining gray water from said mop sink into said gray water storage tank.

20. A food service kiosk, as claimed in claim 19, wherein said at least one sink includes:

a hand sink mounted in said body section at said front end thereof, said first drain pipe being connected between said hand sink and said mop sink for draining water from said hand sink into said mop sink;

a three-hole sink mounted in said body section proximate said hand sink; and a third drain pipe connected between said three-hole sink and said mop sink for draining gray water from said three-hole sink into said mop sink.

21. A food service kiosk, as claimed in claim 19, further including:

a simulated exhaust pipe extending from said body section; and a vent pipe having a first end connected to said gray water storage tank, and said second drain pipe and a second end extending into said simulated exhaust pipe for venting said gray water storage tank to the atmosphere.

22. A food service kiosk which simulates a vehicle and has a self-contained water system mounted therein for storing fresh water and gray water and for supplying fresh water;

food storage and preparation facilities mounted in said kiosk, said facilities including at least one sink;

a fresh water tank;

a hot water heater in fluid communication with said fresh water tank;

an electric pump in fluid communication with said fresh water tank for pumping hot water from said hot water heater and cold water from said fresh water tank to said at least one sink;

a power supply connected to said electric pump;

a gray water storage tank in fluid communication with said at least one sink for receiving gray water therefrom;

a mop sink mounted in said body section below said at least one sink;

a first drain pipe connected between said at least one sink and said mop sink for draining gray water from said at least one sink into said mop sink; and a second drain pipe connected between said mop sink and said gray water tank for draining gray water from said mop sink into said gray water storage tank.

23. A food service kiosk, as claimed in claim 22, wherein said at least one sink includes:

a hand sink mounted in said body section at said front end thereof, said first drain pipe being connected between said hand sink and said mop sink for draining water from said hand sink into said mop sink;

a three-hole sink mounted in said body section proximately to said hand sink; and a third drain pipe connected between said three-hole sink and said mop sink for draining gray water from said three-hole sink into said mop sink.

* * * * *